May 6, 1958     C. N. WINGO     2,833,906
FOOD WARMER
Filed March 5, 1957     3 Sheets-Sheet 2
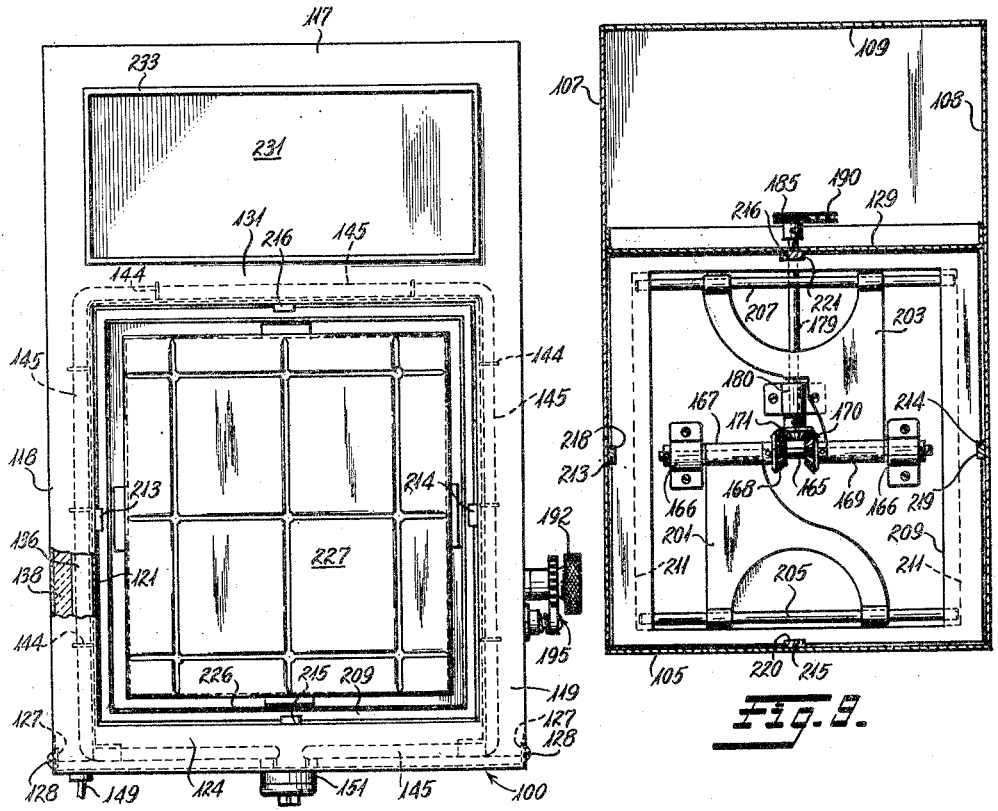
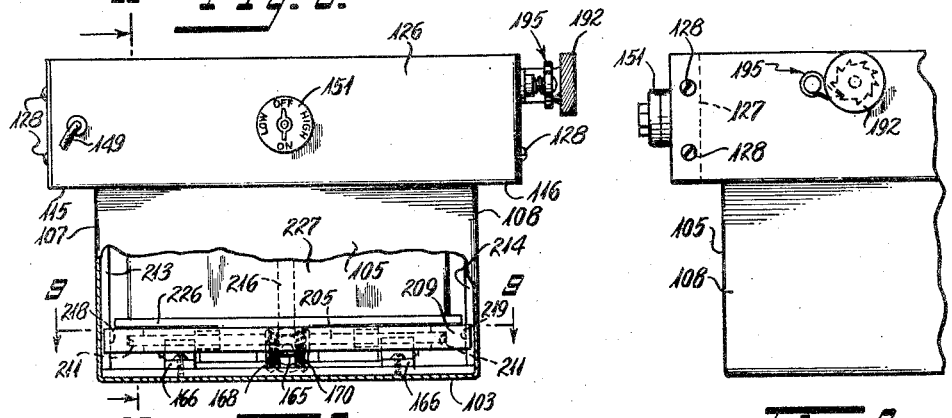
INVENTOR.
Charles N. Wingo
BY
Bacon & Thomas
ATTORNEYS May 6, 1958 C. N. WINGO 2,833,906
FOOD WARMER
Filed March 5, 1957 3 Sheets-Sheet 3
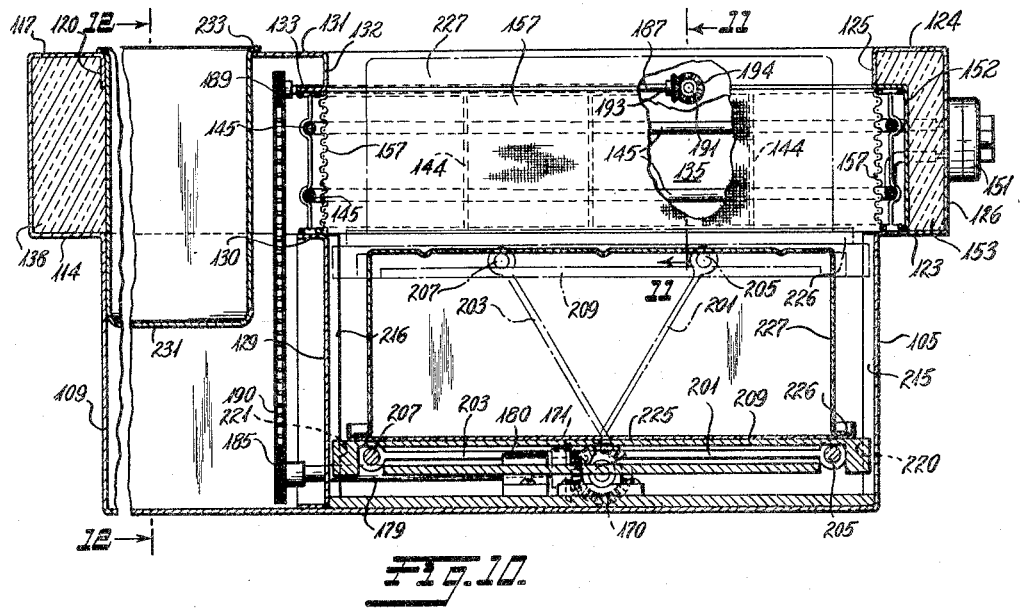
Fig. 10.
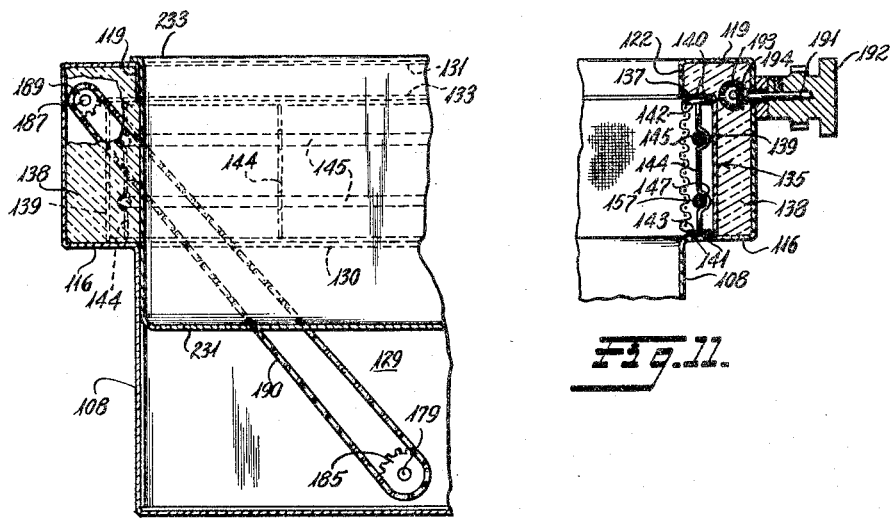
Fig. 12.
Fig. 11.
INVENTOR.
Charles N. Wingo
BY Bacon & Thomas
ATTORNEYS

United States Patent Office 2,833,906
Patented May 6, 1958

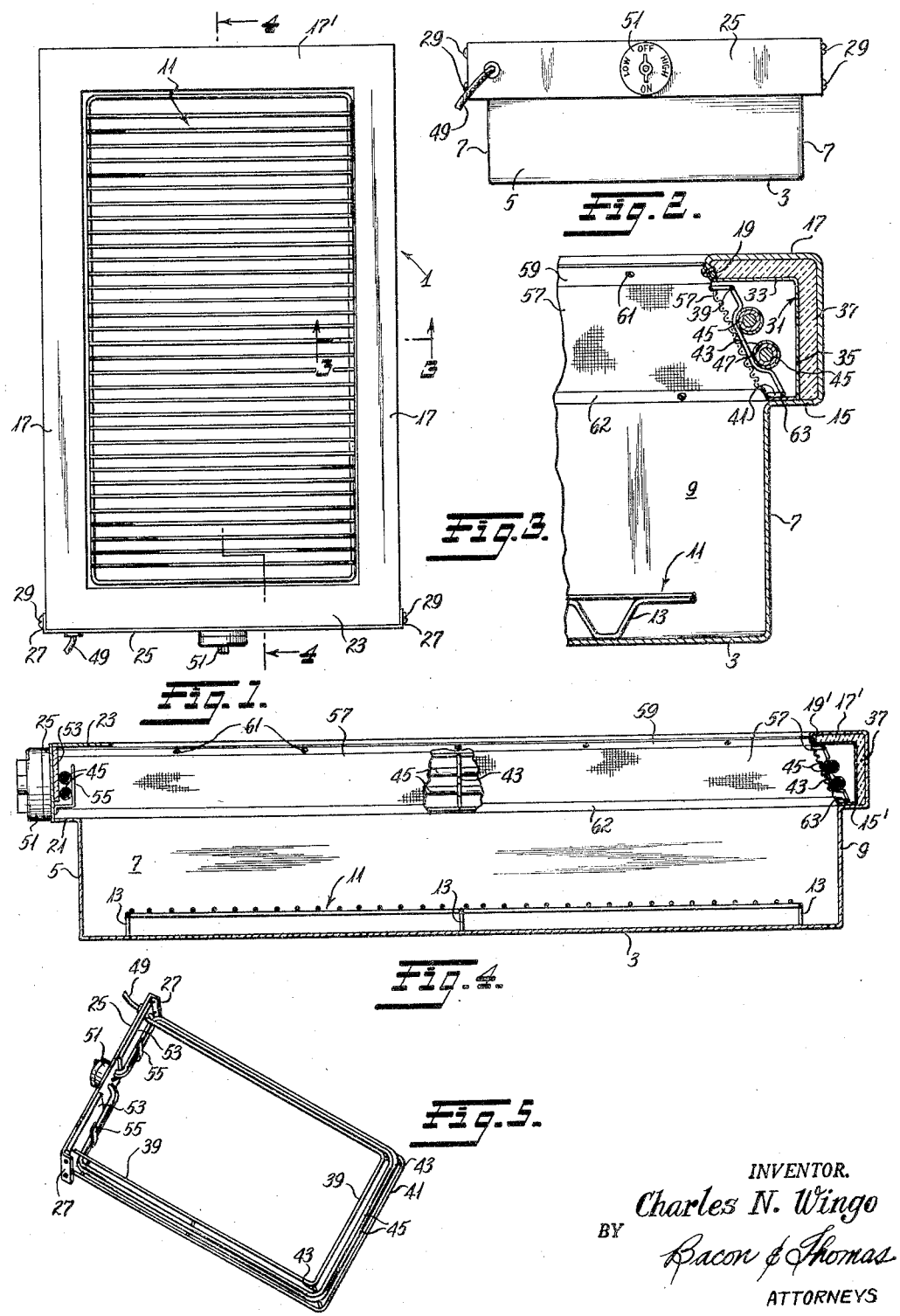

2,833,906

FOOD WARMER

Charles Newton Wingo, Miami, Fla.

Application March 5, 1957, Serial No. 644,018

12 Claims. (Cl. 219—35)

This invention relates, in general, to food warmers and more particularly to a food warmer adapted to heat relatively large quantities of foods and/or to keep them warm during any period between cooking and service. The present invention is particularly adapted for cooking and heating bread, biscuits, rolls or the like, but it will be understood that its use is not limited to these foods for it is well suited for heating meats, vegetables, or any other food which is to be served at a temperature above room temperature.

As is well known, when food is cooked in relatively large quantities for use in cafeterias, restaurants, institutions, or the like, long intervals may elapse between cooking and service. The food must be kept warm at these times and with conventional equipment many problems arise. Primary among these are that heat applied underneath the food tends to leave the bottom hot and the top cold, rather than distributing the heat to all parts of the food. Another important problem is that when a cover is placed over the food to retain the heat, it will accumulate moisture through condensation and in the case of breads, for example, this moisture is enough to render the food damp and soggy. Both of these problems have been made more acute by the extensive use of air-conditioning which increases the temperature differential between the heated foods and the surrounding air. Further, when heat is applied directly to such foods as bread, they will in a relatively short time become dried out and unpalatable.

It is therefore a primary object of this invention to provide a food warmer which will apply heat across the top of the food rather than under it or directly onto it, the heat also being directed down the sides of the warmer and circulated underneath the food to keep all parts of the food at a relatively even temperature.

Another object is to provide a food warmer which eliminates the difficulties of moisture condensation by covering the food with a blanket of hot air rather than with a top.

Still another object of the present invention is to provide a food warmer wherein the food will be readily accessible for serving.

A related object is to provide, where necessary, means for raising the food from within the container for slicing or the like.

Still another object is to provide a food warmer which is adapted both to heat foods to a desired temperature and to maintain them at that temperature over a long period of time.

A further object of the present invention is to provide a food warmer of the type referred to which can be readily used with conventional steam tables or the like, but one which can be used in any location desirable and is readily transferable from one place to another.

A further object is to provide a food warmer which can be readily disassembled for cleaning or servicing purposes and which includes electric heating means which can be readily removed from the rest of the device when desired.

A still further object is to provide a food warmer which is compact in size, light in weight and readily portable.

A still further object is to provide a food warmer which is attractive in design, simple and rigid in construction, and economical to manufacture, operate, and maintain.

Other objects and advantages will be apparent from the following specification taken in conjunction with the accompanying drawings, in which:

Fig. 1 is a top plan view of a food warmer embodying the principles of the invention;

Fig. 2 is an end elevation thereof;

Fig. 3 is a sectional view, on an enlarged scale, taken along the line 3—3 of Fig. 1;

Fig. 4 is a sectional view, on an enlarged scale, taken along the line 4—4 of Fig. 1;

Fig. 5 is a perspective view, showing the replaceable heating unit employed in the invention;

Fig. 6 is a top plan view illustrating another embodiment of the invention;

Fig. 7 is an end elevation thereof, certain parts being broken away to illustrate various details of the invention;

Fig. 8 is a fragmentary side elevation thereof;

Fig. 9 is a sectional view taken along the line 9—9 of Fig. 7;

Fig. 10 is a fragmentary sectional view, on an enlarged scale, taken along the line 10—10 of Fig. 7;

Fig. 11 is a fragmentary sectional view taken along the line 11—11 of Fig. 10; and Fig. 12 is a fragmentary sectional view taken along the line 12—12 of Fig. 10.

Referring now in detail to the drawings, the food warmer, generally indicated by the numeral 1, is preferably of a rectangular shape and includes a bottom 3, front wall 5, side walls 7, 7, and the rear wall 9. A raised grill 11, provided with a plurality of legs 13, may be placed on the bottom 3 to support the food in spaced relation with respect thereto.

As illustrated in Fig. 3, the upper part of each side wall 7 includes an outwardly extending shoulder 15 and has an inturned flange 17 at its upper extremity which terminates in a downwardly extending rim portion 19. As illustrated in Fig. 4, the rear wall 9 is similarly provided with an outwardly extending shoulder 15', an inturned flange 17', and a downwardly extending rim portion 19'.

Front wall 5 has a shoulder 21 at the same height as, and equal in lateral dimension to, shoulders 15 and 15' and has a flange 23 similarly corresponding to flanges 17 and 17'. Some or all of the upper portion of wall 5 above shoulder 21 is removed and a panel 25 is provided to cover the opening. Panel 25 is provided at either side thereof with flanges 27 adapted to lap over the upper portions at side walls 7, said panel being removably secured to the main body of food warmer 1 by screws 29 extending through said flanges and into said upper portions.

L-shaped reflecting members 31 are provided in the channels between shoulders 15 and flanges 17 and between shoulders 15' and 17'. Members 31 include upper horizontal legs 33 extending from the lower extremities of rim portions 19 and 19' in parallel spaced relation to flanges 17 and 17', and vertical legs 35 extending downwardly therefrom in parallel spaced relation to the upper portions of side walls 7 and rear wall 9, terminating in abutting relation with shoulders 15 and 15'.

Members 31 may be made of any suitable reflecting material such as stainless steel and are secured in position by welding, soldering, or any other suitable means (not shown).

The spaces between leg 33 and flanges 17 and 17' and between leg 35 and the upper portions of walls 7 and 9 are filled with any suitable insulation material 37, such as asbestos or fiberglass.

A rigid upper wire 39 and a rigid lower wire 41, connected together in spaced parallel relation by a plurality of strut members 43, are suitably secured at one end to one side of panel 25 and are shaped to extend continuously within the channels between shoulders 15 and flanges 17 and between shoulder 15' and flange 17', being secured in turn at their other ends to the other side of panel 25. The wires 39 and 41 therefore extend along the upper extremities of food warmer 1 along all four sides thereof, and it is preferred that the upper wire lie somewhat inwardly of the lower wire so that the strut members 43 are inclined and the wires themselves will be disposed in the vicinity of opposite extremities of L-shaped reflecting members 31.

Electric heating elements 45, of any suitable kind, extend between and generally parallel to wires 39 and 41, being mounted in suitable depressions 47 in the struts 43. The opposite ends of heating elements 45 extend inwardly along the inside of panel 25, being spaced therefrom by asbestos sheet members 53 or the like and being secured thereto by any suitable mounting brackets or clips 55. Current is supplied to heating elements 39 from any suitable outside source by an inlet cord 49 suitably connected to a switch 51, which is, in turn, connected to said elements. The switch 51 is preferably of the conventional type which will supply current selectively to any one or all of the heating elements to permit the heat to be delivered to the receptacle in, for example, three different amounts: low, medium and high.

To prevent food, cooking utensils or the user's hands from accidentally coming in contact with the heating elements, screening 57 is disposed inwardly of heating elements 45, and is inclined across the channels formed by shoulders 15 and flanges 17 and shoulder 15' and flange 17'. Screening 57 is supported between upper frame members 59, secured by screws 61 or the like to portions 19 and 19' and lower frame members 62 having inturned lower marginal flanges 63 lying along shoulders 15 and 15'.

It will readily be seen that the most of the heat produced by heating elements 45 will be reflected laterally by the vertical legs 35 of reflecting members 31 to form a layer of hot air across the top of the food warmer 1, while a great deal of heat will be reflected downwardly by the horizontal legs 33 of the reflecting members 31 to heat the sides of the food and circulate under the bottom thereof.

When it is desired to clean the receptacle or service its electrical components, the screws 61 are removed to allow the screening 57 to be taken out and the screws 29 are removed so that panel 25, supporting wires 39 and 41 and heating elements 45 can be removed.

In another embodiment of the invention, disclosed in Figs. 6-12, the receptacle is generally identified by the numeral 100. This embodiment includes a bottom 103, front wall 105, side walls 107, 108 and a rear wall 109. Rear wall 109 and side walls 107 and 108 are provided with outwardly extending shoulders 114, 115 and 116, respectively, and have inturned flanges 117, 118 and 119 respectively, at their upper extremities. Flanges 117, 118 and 119 terminate in downwardly extending rim portions 120, 121 and 122, which lie in the same plane as the lower portions of the respective walls.

Front wall 105 is provided with a shoulder 123 at the same height as shoulders 114, 115 and 116 and has a flange 124 and a rim portion 125 corresponding to the inturned flanges and rim portions of the rear end side walls. Some or all of the upper portion of front wall 105 above shoulder 123 is removed, and a panel 126 is provided to cover the opening. Flanges 127 are provided at either side of panel 126 and are adapted to be removably secured to the upper portions of side walls 105 by screws 128.

A dividing wall 129 is suitably secured across the receptacle 100 between side walls 107 and 108 and serves to separate the major section of the receptacle at the front from a smaller rear section whose purpose will appear hereinafter. The dividing wall 129 terminates in a rearwardly turned marginal flange 130 at a level corresponding to that of shoulders 114, 115, 116 and 123.

A web 131 extends across receptacle 100 above dividing wall 129 between flanges 118 and 119 and has a downturned forward edge 132 corresponding to rim portions 121, 122 and 125 of the side walls and front wall. The downturned forward edge 132, in turn, terminates in a rearwardly turned lateral flange 133 which lies in opposed relation to flange 130.

An L-shaped reflecting member 135 is disposed along the upper portion of side wall 108 between shoulder 116 and flange 119 and extends from a point adjacent the front of the receptacle rearwardly to the point where dividing wall 129 and web 131 extend thereacross. Reflecting member 135 includes an upper horizontal leg 137 extending from the lower extremity of rim portion 122 in parallel spaced relation to flange 119, and a vertical leg 139 extending downwardly therefrom in parallel spaced relation to the upper portion of side wall 108 and terminating in abutting relation with shoulder 116.

Another L-shaped reflecting member 136 (Fig. 6) is similarly mounted along the upper portion of side wall 107 in opposed relation to reflecting member 135.

Insulating material 138 may be employed behind reflecting members 135 and 136 and along the upper portion of rear walls 109 and the upper portion of side walls 107 and 108 in the rear section of the receptacle.

One or more heating elements 145 are adapted to be positioned within the uppermost portion of the receptacle 100. Heating elements 145 are connected through a suitable switch 151, mounted at the center of panel 126, to an inlet cord 149 and have portions extending along the inner face of said panel. An L-shaped reflecting member 152 may be positioned between heating elements 145 and panel 126, and may be separated from panel 126 by insulating material 153. Heating elements 145 extend along the upper portions of side walls 107 and 108 across the receptacle and between opposed flanges 130 and 133. It will thus be seen that the heating elements 145 extend all the way around the inside of the front section of the receptacle.

A pair of rigid parallel upper wires 140, and a pair of rigid parallel lower wires 141 are employed to mount heating elements 145 in position within the upper portion of receptacle 100. Wires 140 are spaced by a plurality of interconnecting wires 142, and wires 141 are spaced by a plurality of interconnecting wires 143. Strut members 144 between wires 142 and wires 143 serve to maintain upper wires 140 in spaced parallel relation to lower wires 141. The heating elements 145 are mounted in suitable depressions 147 in the strut members 144. Screening 157 may be positioned inwardly of the heating elements 145 and secured by soldering or the like to wires 140 and 141.

The assembled unit, including heating elements 145, screening 157, and the aforedescribed framework of mounting wires is adapted to be introduced into the receptacle through the opening provided in the upper portion of front wall 105, the end of the unit being snugly received between flanges 130 and 133, and the opposite sides of the unit being slidably received in the channels formed by reflecting member 135 and shoulder 116 and by reflecting member 136 and shoulder 115. The unit may be withdrawn readily upon removal of panel 126.

A transverse shaft 165 is mounted at the bottom of the receptacle between a pair of bearings 166. A sleeve 167 and a bevel gear 168 rigidly secured together are rotatably mounted on one end of shaft 165 and a sleeve 169 and a bevel gear 170 rigidly secured thereto are non-rotatably mounted on the other end of shaft 165 through the agency of a key or the like (not shown). Gears 168 and 170 thus lie in opposed relation adjacent the center of the shaft 165 and a third bevel gear 171 is positioned for operative engagement with both. Gear 171 is secured to one end of a longitudinal shaft 179 which is mounted in a bearing support 180 and extends through the dividing wall 129. A sprocket 185, mounted at the opposite end of shaft 179, lies immediately to the rear of wall 129. A shaft 187 extends along the upper portion of wall 108 behind reflecting member 135 and has a sprocket 189 at one end thereof operatively connected with sprocket 185 by sprocket chain 190. Suitable provision is made to keep the insulation 138 from interfering with rotation of shaft 187. The other end of shaft 187 is connected to the shaft 191 of a handle 192 by means of bevel gears 193 and 194. A pawl-and-ratchet assembly 195 may be used in association with the handle 192 to control rotation of the shaft 191.

An arm 201 is rigidly secured to sleeve 167 and extends toward the front of the receptacle while a similar arm 203 is secured to sleeve 169 and extends rearwardly therefrom. Transverse guide bars 205 and 207 are secured at the outer ends of the arms 201 and 203, respectively, and serve as a lifting connection for a rectangular support frame 209. The outer extremities of bars 205 and 207 extend into opposed inwardly facing guide slots 211 in the transverse members of frame 209. Thus, upon actuation of the handle 192, shafts 191 and 187 are rotated, and in turn rotate shaft 179 through sprocket chain 190. The rotation of bevel gear 171 imparts rotation in opposite directions to the gears 168 and 170, causing the arms 201 and 203 to pivot upwardly about the axis of shaft 165, and transverse bars 205 and 207, moving toward each other in slots 211, raise the support frame 209. As will be readily apparent from the drawings, when the frame 209 is raised the pawl-and-ratchet assembly 195 serves to maintain it in its elevated position.

Vertical guide members 213, 214, 215 and 216 may be provided on the side walls 107 and 108, front wall 105 and dividing wall 129 for cooperation with slots 218, 219, 220 and 221 on the support frame 209 to keep the frame in correct position as it is raised or lowered.

A bottom pan 225 with a rim 226 may be supported on frame 209 and food may be supported on an inverted pan-like food support 227 placed in the pan 225. The food support 227 may be of whatever height is necessary to support the food in an exposed position when the frame is raised, as shown in phantom lines in Fig. 10. Similar results may be attained by raising the transverse shaft 165 or by other expedients as called for by the intended use to which the receptacle is to be put.

In the rear portion of the receptacle, a removable well 231 may be provided for gravy or the like. Well 231 includes a collar flange 233 whereby it may be suspended in the rear portion within web 131 and flanges 117, 118 and 119. Heat may be applied to the well 231 from the rear end of elements 145 or by some supplemental heating means (not shown) to keep the contents warm.

Thus, it will be apparent that the food warmer described hereinbefore is fully adapted for the various purposes noted and fully achieves the stated objects. It will be understood that a number of additions, substitutions and modifications may be made without departing from the principles of the invention and the scope of the annexed claims.

I claim:

1. A food warmer, comprising: an open-topped receptacle having side walls, front and rear walls, and a bottom; means for supporting food within said receptacle; a heating element mounted in the uppermost part of said receptacle along the inside of one of said walls; reflecting means mounted between said heating element and said one wall and arranged to direct heat from said heating element across said receptacle above said food; and reflecting means mounted above said heating element and arranged to direct heat from said heating element downwardly along said one wall.

2. A food warmer, comprising: an open-topped receptacle having side walls, front and rear walls, and a bottom; means for supporting food within said receptacle; a heating element mounted in the uppermost part of said receptacle along the inside of one of said walls; reflecting means mounted between said heating element and said one wall and arranged to direct heat from said heating element across said receptacle above said food; and reflecting means mounted above said heating element and arranged to direct heat from said heating element downwardly along said one wall.

3. A food warmer, comprising: an open-topped receptacle having side walls, front and rear walls, and a bottom; means for supporting food within said receptacle in spaced relation with respect to said bottom; and heating element mounted in the uppermost part of said receptacle along the inside of one of said walls; reflecting means mounted between said heating element and said one wall and arranged to direct heat from said heating element across said receptacle above said food; and reflecting means mounted above said heating element and arranged to direct heat from said heating element downwardly along said one wall for circulation along said bottom underneath said food.

4. A food warmer, comprising: an open-topped receptacle having side walls and rear walls and a bottom, said front wall having an opening formed therein; a removable panel mounted over said opening; means for supporting food within said receptacle; a heating element mounted in the uppermost part of said receptacle along the inside of said side walls, said heating element being capable of withdrawal through said opening; reflecting means mounted between said heating element and said walls arranged to direct heat from said heating element across said receptacle above said food; and reflecting means mounted above said heating element and arranged to direct heat from said heating element downwardly along the side walls of said receptacle.

5. A food warmer, comprising: an open-topped receptacle having side walls, front and rear walls, and a bottom, said front wall having an opening formed therein adjacent its upper extremity; a removable panel mounted across said opening; a heating element secured to said panel and disposed in the upper portion of said receptacle along the inside of said side walls, said heating element being adapted to be withdrawn through said opening upon removal of said panel; reflecting means mounted between said heating element and said one side wall and arranged to direct heat from said heating element across said receptacle above said food; and reflecting means mounted above said heating element and arranged to direct heat from said heating element downwardly along said one side wall for circulation along said bottom underneath said food.

6. A food warmer, comprising: an open-topped receptacle having opposed side walls, front and rear walls, and a bottom and adapted to receive food therein; means for supporting food within said receptacle; means forming opposed channels at the top of said receptacle in said opposed side walls; a heating element slidably received in said channels and extending around the uppermost part of said receptacle along the inside of said side walls, said heating element being removable from said receptacle through an opening formed in said front wall; reflecting means in said channels lying outwardly of said heating element and arranged to direct heat horizontally across said receptacle above said food; reflecting means in said channels above said heating element and arranged to direct heat vertically downwardly along the side walls of said receptacle.

7. A food warmer, comprising: an open-topped receptacle having opposed side walls, front and rear walls, and a bottom; means for supporting food within said receptacle; means forming opposed channels at the top of said receptacle in said opposed side walls; a generally rectangular wire framework slidably received in said channels and mounting a heating element which extends around the uppermost part of said receptacle along the inside of said side walls and said front and rear walls; a front panel positioned across an opening in the front wall of said receptacle and being secured to said heating element and to said framework, whereby said heating element and said framework are removed from said receptacle through said opening when said panel is removed; reflecting means in said channels lying outwardly of said heating element and arranged to direct heat horizontally across said receptacle above said food; and reflecting means in said channels above said heating element and arranged to direct heat vertically downwardly along the side walls of said receptacle.

8. The device of claim 7 wherein insulating material is employed in back of said reflecting members.

9. The device of claim 8 wherein screening is positioned inwardly of said heating element.

10. A food warmer, comprising: an open-topped receptacle having side walls, front and rear walls, and a bottom; means for supporting food within said receptacle; a heating element mounted in the upper most part of said receptacle along the inside of one of said walls; reflecting means mounted between said heating elements and said one wall and arranged to direct heat from said heating element across said receptacle above said food; reflecting means mounted above said heating element and arranged to direct heat from said heating element downwardly along said one wall; and means for raising said food-supporting means from its normal position within said receptacle to a position above said heating elements where heat is not applied directly thereto.

11. A food warmer, comprising: an open-topped receptacle having opposed side walls, front and rear walls, and a bottom; a heating member mounted around the upper extremities of said receptacle; reflecting means mounted above and outwardly of said heating member and arranged to direct heat horizontally across the top of said receptacle and vertically downwardly along the inner surfaces of said walls; food-supporting means mounted in said receptacle for vertical movement therein; control means accessible from the exterior of said receptacle; and operating mechanism connecting said control means to said food support, whereby said food support may be selectively raised or lowered.

12. A food warmer, comprising: an open-topped receptacle having opposed side walls, front and rear walls, and a bottom; a dividing wall across said container separating said container into two sections; heating elements surrounding the upper portions of one of said sections; and reflecting members associated with portions of said heating elements and arranged to direct heat horizontally across the top of said section and vertically downwardly toward the bottom of said receptacle, another portion of said heating element being situated above said dividing wall and delivering heat to both sections of said receptacle.

References Cited in the file of this patent

UNITED STATES PATENTS

| | | |
|---|---|---|
| 2,638,526 | Kircher et al. | May 12, 1953 |
| 2,668,665 | Schardt | Feb. 9, 1954 |
| 2,695,352 | Dekold | Nov. 23, 1954 |

FOREIGN PATENTS

| | | |
|---|---|---|
| 681,140 | Germany | Sept. 15, 1939 |